United States Patent [19]

Ruffin et al.

[11] Patent Number: 5,060,593

[45] Date of Patent: Oct. 29, 1991

[54] DEVICE FOR APPLYING ADHESIVE ONTO FIBER AND DRYING BEFORE WINDING

[75] Inventors: Paul B. Ruffin, Huntsville; Michael L. Steelman, Madison; Kenneth A. Corbett; Charles A. Mandy, Jr., both of Huntsville, all of Ala.

[73] Assignee: The United States of America as represented by the Secretary of the Army, Washington, D.C.

[21] Appl. No.: 542,508

[22] Filed: Jun. 25, 1990

[51] Int. Cl.$^5$ .................... B05C 3/15; B05C 11/00
[52] U.S. Cl. .................... 118/65; 118/405; 118/DIG. 18
[58] Field of Search ............ 118/405, DIG. 18, 65; 427/178, 163

[56] References Cited

U.S. PATENT DOCUMENTS 4,554,179  11/1985  Roderburg .................... 427/178 X
4,704,307  11/1987  Jochem et al. ................ 427/163 X

FOREIGN PATENT DOCUMENTS 53-144985  12/1978  Japan .................... 118/65

OTHER PUBLICATIONS

Hawley, G. G., "The Condensed Chemical Dictionary", Ninth Edition, New York, Van Nostrand Reinhold Company, 1977, p. 17.

*Primary Examiner*—Evan Lawrence
*Attorney, Agent, or Firm*—Freddie M. Bush; Hay Kyung Chang

[57] ABSTRACT

A device for applying adhesive onto a fiber, such as an optical fiber, is located between the fiber supply spool and rewinder and comprises a covered cup for holding liquid adhesive, and a drying chamber. The cup has first and second bores for passing the fiber therethrough and is suitably insulated from external temperature changes. The entrance of the drying chamber is coupled to a side of the cup so that it surrounds the second bore.

3 Claims, 1 Drawing Sheet

DEVICE FOR APPLYING ADHESIVE ONTO FIBER AND DRYING BEFORE WINDING

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

Fiber optic cables are now used in many land, water, air and space applications where optical fiber provides the communication link between a vehicle and a tethered point on the land, water, air and in space. Optical fiber is wound onto a bobbin in a manner that will allow the fiber to unwind (or payout) during the travel of the vehicle. In order to provide stability of the fiber on the bobbin and allow successful payout, application of an adhesive with the proper strength characteristic onto the fiber is required. Current adhesive application is accomplished during or after the winding process. One method of application currently in use applies adhesive during winding and involves pressureless dies and wicking fixtures. In this method, a fiber is pulled through a bath of adhesive and then wound onto a bobbin in a wet state. If a winding flaw occurs, the correction can be made by either physically moving the fiber to eliminate the flaw or unwinding past the flawed area and rewinding. In both cases, flaw correction produces a change in the wet adhesive coating due to contact or removal which can affect the adhesive performance in the corrected area. In addition, it is necessary to clean the fiber during rewind to remove the wet adhesive to ensure that none deposits on winder pulleys or corrupts the fiber remaining on the supply spool. The correction of winding flaws using these techniques is a highly time-consuming process.

Another current method applies the adhesive after the winding of each layer of fiber onto the bobbin. Adhesive is diluted by mixing with various solvents and the mixture is sprayed onto the bobbin using an air brush. This method requires typically several minutes of drying time to ensure that the majority of the solvents have evaporated. Winding flaws are corrected prior to spraying to avoid the correction problems associated with the die/wick method described above. The spraying method does not produce uniform coating of fiber due to operator dependence and the application technique. Further, solvents used in the adhesive mixture may cause damage in the optical fiber.

SUMMARY OF THE INVENTION

The present invention provides a device and method for applying a coating of liquid adhesive onto a fiber and drying the adhesive on the fiber before winding the fiber onto a takeup spool or a bobbin. Depositing adhesive onto fiber and passing the fiber through a drying chamber produces a uniform dry coating of adhesive on the fiber. This combines the advantages of the coating uniformity achieved with the die/wick system and the ease of winding flaw correctability provided by the spray method.

DESCRIPTION OF THE PREFERRED EMBODIMENT

Figure 1:
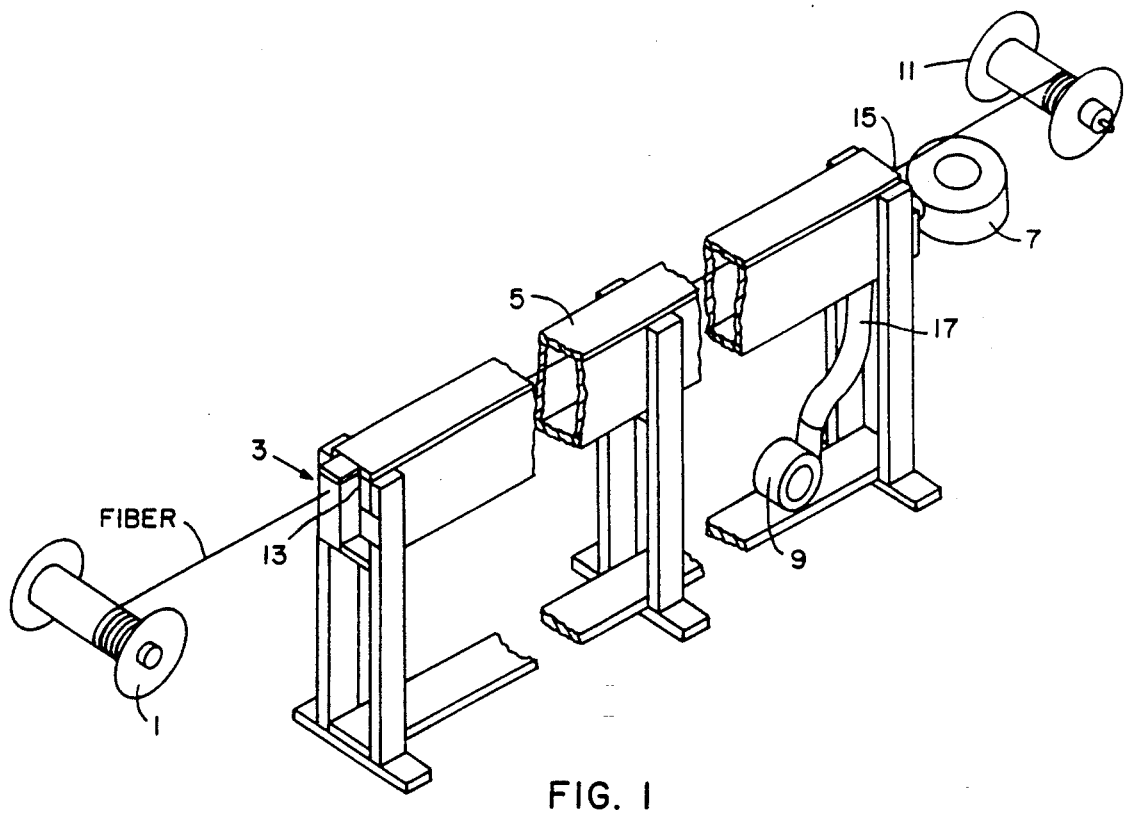
FIG. 1 shows the preferred embodiment of the invention.
Figure 2:
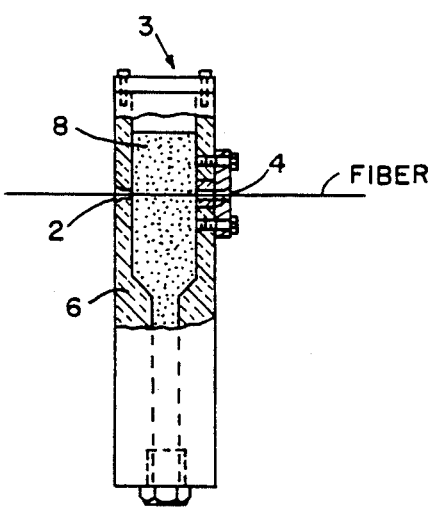
FIG. 2 is a detailed cross sectional view of the cup containing the adhesive.

Referring now to the drawings wherein like numbers refer to like parts, FIG. 1 shows the system for applying liquid adhesive onto fiber and drying the adhesive thereon before winding the fiber onto the rewinder which can be either a takeup spool or bobbin depending on whether the adhesive will further be cured after the fiber is rewound. If curing is anticipated, then the fiber with the dried adhesive thereon must be wound onto a bobbin. FIG. 2 shows the details of cup 3.

Fiber is initially unwound from supply spool 1, then passed through first orifice or bore 2 on first side of cup 3. Cup 3 which is covered and insulated from external temperature changes by suitable insulating material 6 contains liquid adhesive 8 that will provide the necessary adhesive performance characteristics required for a particular purpose. The fiber passes through adhesive 8 and departs the cup by second orifice or bore 4 on the opposite side of cup 3 and immediately enters drying chamber 5 by entrance 13 thereto and continues to travel the length of the chamber. Both first bore 2 and second bore 4 must be large enough to accommodate the diameter of the fiber yet small enough to allow deposition of desired amount of adhesive onto the fiber to provide the required adhesive properties. Drying chamber 5 is maintained at a constant temperature which is suitable to accomplish drying the adhesive on the fiber by the time the fiber leaves the chamber by exit 15. The fiber with dried adhesive thereon is then wound onto rewinder 11. The temperature inside chamber 5 is maintained at a desired level by blower 9 blowing hot air into chamber 5 via pipe 17 and by blower 7 blowing cool air in the appropriate amount into chamber 5 to mix with the hot air to achieve the desired temperature and maintain it. The temperature inside the chamber may also be controlled by blowing into it air that is already at a desired temperature. Other methods of maintaining the drying temperature may include the use of ultraviolet, laser or microwave energy within the drying chamber.

The adhesive application method was demonstrated using Corning optical fiber of 0.0097 inch average diameter which was passed through bores of 0.011 inch diameter. The fiber was pulled through a cup holding 100% 3-M Scotch-Weld Epoxy Primer. It was then entered into a drying chamber that was 20 feet long inside which the fiber was moved at approximately three feet per second, resulting in about 7 seconds of drying time. The temperature inside the chamber was maintained at 230° F. by hot air blown into the chamber by a heat shrink gun operating at around 500 ° F. This hot air was mixed inside the chamber with cool air blown into the chamber by cool air blower to achieve the desired 230° F. After the Epoxy Primer adhesive on Corning fiber was dried, the fiber was wound onto a tapered cylindrical bobbin for subsequent curing. During winding onto the bobbin, the adhesive exhibited no tackiness and wound as well as standard optical fiber with no adhesive coating. All winding errors that occurred were easily correctable and none of the errors are believed to have been the result of the applied adhesive. The dried adhesive coating also made it easier to perform the automatic stepbacks due to increased coefficient of friction of the dry coated fiber versus wet fiber or bare fiber. Upon completion of the winding process, the bobbin was placed in a temperature chamber where it was heated to 200 degrees F for 8 hours to provide final cure of the adhesive. The bobbin was then subjected to a high speed payout and found to perform satisfactorily at an acceptable speed at both ambient and low temperature extremes and with low noise pull forces. No large transients were observed on the large end of the bobbin as normally seen during high speed payouts. This improvement is believed to be due to adhesive uniformity.

Although a particular embodiment and form of this invention has been illustrated and demonstrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A device for applying adhesive onto a fiber as the fiber is unwound from a supply spool and rewound onto a rewinder, said device being located between said supply spool and said rewinder and comprising: a covered cup, said cup being suitably insulated from external temperature changes and further being suitable for containing liquid adhesive therein and having a first bore on a first side and a second bore on a second side, said first bore being suitably positioned to receive said fiber from aid supply spool, said bores further being large enough to pass said fiber therethrough and small enough to deposit a desired amount of adhesive on the fiber; a drying chamber having an entrance and an exit at opposite ends, said entrance being coupled to said second side of said cup such that said entrance surrounds said second bore, said exit being positioned to enable fiber passing therethrough to be wound onto said rewinder; and a means to maintain a suitable drying mechanism inside said chamber.

2. A device as described in claim 1, wherein said means to maintain are a source of hot air and an air blower, said source being suitably positioned and connected to said chamber to supply said chamber with hot air and said air blower being positioned to supply said chamber with an appropriate amount of cool air to mix with the hot air inside said chamber.

3. A device as set forth in claim 2 wherein said bores are coaxial and said first and second sides are opposite each other.

* * * * *